United States Patent [19]

Markov

[11] Patent Number: 4,606,441
[45] Date of Patent: Aug. 19, 1986

[54] DEVICE FOR DAMPING IMPACT LOAD

[75] Inventor: Vladimir A. Markov, Moscow, U.S.S.R.

[73] Assignee: Vsesojuzny Nauchno-Issledovatelsky Institut Textilno-Galantereinoi Promyshlennosti, Moscow, U.S.S.R.

[21] Appl. No.: 552,177

[22] PCT Filed: Feb. 24, 1982

[86] PCT No.: PCT/SU82/00007

§ 371 Date: Oct. 21, 1983

§ 102(e) Date: Oct. 21, 1983

[87] PCT Pub. No.: WO83/02902

PCT Pub. Date: Sep. 1, 1983

[51] Int. Cl.⁴ .............................................. A62B 35/00
[52] U.S. Cl. ........................................ 188/371; 280/805; 297/472; 244/122 B
[58] Field of Search ............... 299/470, 471, 472; 188/371, 268, 266, 375; 280/805; 244/152, 122 B, 138 R; 66/192, 193, 194

[56] References Cited

U.S. PATENT DOCUMENTS

| | | | |
|---|---|---|---|
| 3,444,957 | 5/1969 | Ervin, Jr. | 182/3 |
| 3,827,660 | 8/1974 | Doolittle | 244/110 C |
| 3,861,744 | 1/1975 | Yamada et al. | 297/386 |
| 3,897,106 | 7/1975 | Takada | 297/472 |
| 4,297,858 | 11/1981 | Blasbery et al. | 66/194 |

FOREIGN PATENT DOCUMENTS

| | | | |
|---|---|---|---|
| 0545868 | 3/1956 | Belgium | 280/805 |
| 2233528 | 1/1975 | France | 280/805 |
| 1015298 | 12/1965 | United Kingdom | 188/371 |
| 1260397 | 1/1972 | United Kingdom | . |
| 1447740 | 8/1976 | United Kingdom | . |
| 1458119 | 12/1976 | United Kingdom | . |
| 2009588 | 6/1979 | United Kingdom | . |
| 820833 | 4/1981 | U.S.S.R. | . |
| 831132 | 5/1981 | U.S.S.R. | . |
| 816821 | 4/1982 | U.S.S.R. | . |

*Primary Examiner*—Bruce H. Stoner, Jr.
*Assistant Examiner*—Alvin Oberley
*Attorney, Agent, or Firm*—Fleit, Jacobson, Cohn & Price

[57] ABSTRACT

A support and associated flexible untearable band which incorporates a plurality of energy-absorbing loops intended to destruct under the effect of an applied impact load. The energy-absorbing loops are made of an elastic elongated material and are secured on the band, and a rigid holder is provided onto which the loops are put one after another. The flexible band is a woven ribbon provided on at least one side with at least one row of woven loops made integral with the ribbon and having a width less than the width of the woven ribbon itself.

4 Claims, 20 Drawing Figures

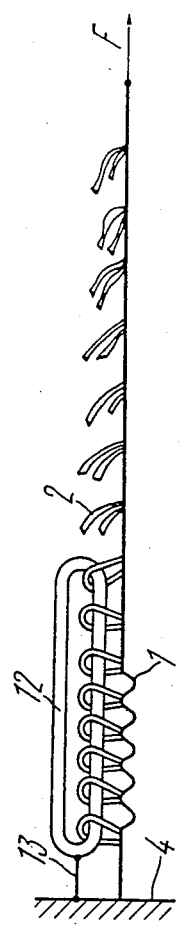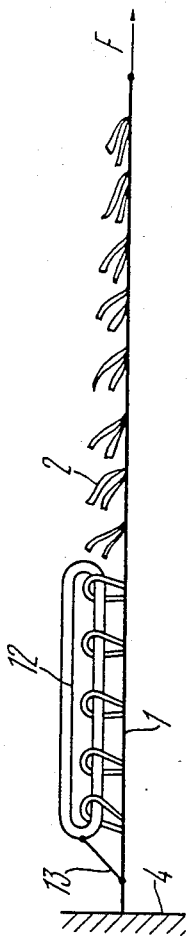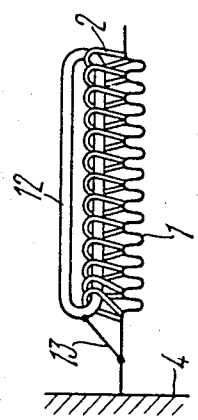

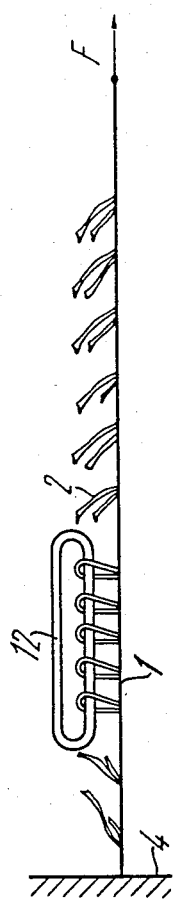
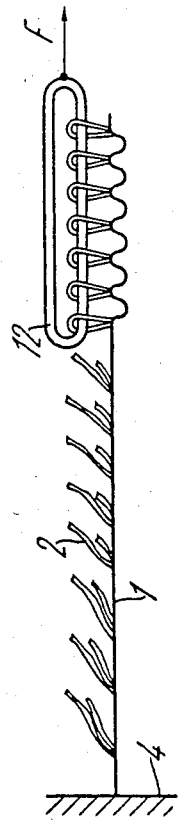
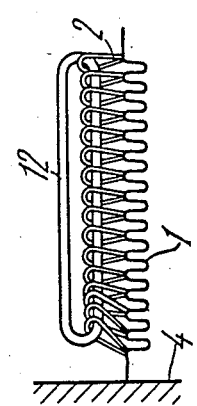
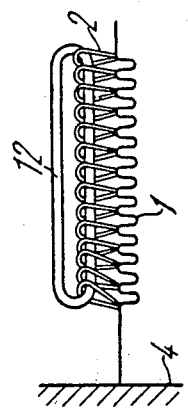

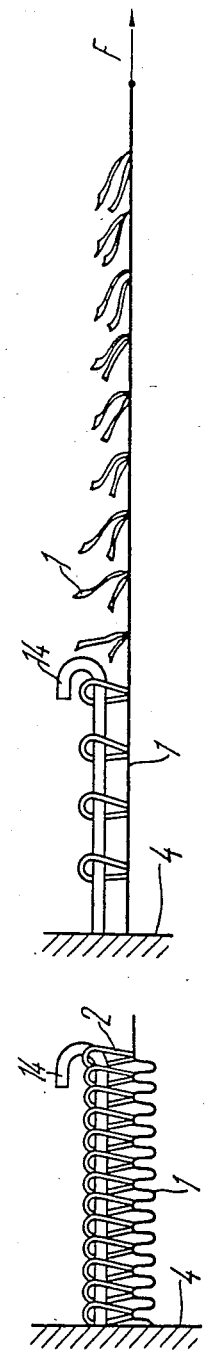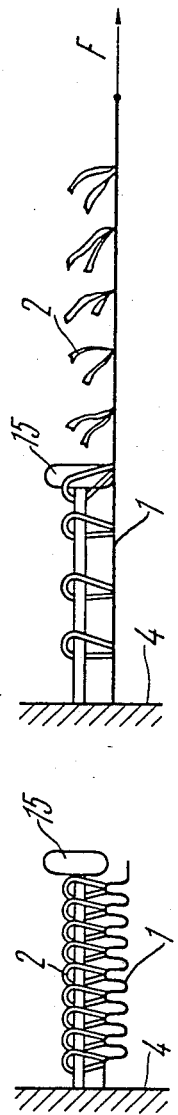

DEVICE FOR DAMPING IMPACT LOAD

TECHNICAL FIELD

The present invention relates to safety engineering means and more specifically it concerns shock absorbers or dampers capable of absorbing impact effect of kinetic energy due to high-rate plastic deformation at a preset load and elongation level.

BACKGROUND ART

A great many types of devices for absorbing the impact effect of kinetic energy are heretofore known for use in automobile safety seat belts. Most promising is use in such belts of devices whose action is based on plastic deformation of some textile materials, which is accounted for by their simple construction, high reliability and low cost. However, effective application of textile shock absorbers may be hampered for some types of devices by difficulties involved in providing a high operating threshold, and for other types, by considerable loss of strength occurring in the case of high-rate loading due to heat evolution resulting from interaction of structural elements of a textile material. That is why the provision of devices for effective damping of high-rate loading is an urgent problem nowadays.

Known in the present state of the art is a construction of a damping device for an automobile safety seat belt. The device consists of a textile band folded into a loop and stitched across with sewing threads. The thus-stitched loop is pressed against one of the textile band ends and a sleeve is fitted onto the loop and the band end. Then one of the band ends is attached to the car body, the other being held to the band of the safety seat belt. Once the load imposed upon the safety seat belt has exceeded the operating threshold of the damping device it starts absorbing energy. As a result, first the sleeve is liable to destruct, then the sewing thread stitches do so in succession.

It is however too difficult to make packaged damping devices featuring the operating threshold of 1000 kgf and over using the now-adopted technique for joining the textile band of the device. Practice demonstrates that, when using textile bands 30 to 40 mm wide made from yarn having a tensile breaking strength of 65 to 70 gf/tex, it is difficult to produce damping devices having the operating threshold in excess of 200 kgf. In addition, the operating threshold of the device is liable to considerably reduce at a fast-rate loading as compared to the results of static loading. It is also impossible to carry out a reliable nondestructive check for quality of the sewing joint, which affects adversely its reliability.

One more device for damping the impact load in a safety system is known in the art, comprising a support and a flexible untearable band associated with said device, said band incorporating an energy-absorbing means liable to destruct under the load applied. The energy-absorbing device is made as a strap built up of two bands bonded together. One end of the flexible untearable band is associated with the car body, while the other, with the bracket likewise fastened on the car body. The bracket carries also a reel for one of the ends of the safety seat belt band to hold and wind up. In the case of an abrupt loading of the safety seat belt the reel, provided with special retainers, wedges up the band, thus preventing it from unreeling. Once a preset load is attained the bracket along with the reel is detached from the car body, whereupon the strap of the flexible band of the device for damping impact load starts taking up load. As a result, the strap begins separating into two portions at a preset load and thus absorbing surplus kinetic energy.

However, the known damping discussed hereinbefore likewise offers no possibility of carrying out a nondestructive reliable check for quality of bonded joints, especially after operation under different atmospheric conditions, which affects adversely the reliability of the device.

DISCLOSURE OF THE INVENTION

The invention is aimed at the provision of a packaged and effective device for damping impact load, having an operating threshold up to 1000 kgf and over, on the base of bands up to 50 mm wide due to use of an energy-absorbing means of simpler and more reliable construction.

An object of the invention is also to eliminate the aforementioned disadvantages inherent in the heretofore known devices for damping impact load.

The aforementioned object is accomplished due to the fact that in a device for damping impact load in a safety system, comprising a support and a flexible untearable band associated with said support and incorporating an energy-absorbing means, which is liable to destruct upon application of a load thereto, according to the invention, the energy-absorbing means is fashioned as a number of loops made from a long-sized material, which are fastened on the band, and a contrivance in the form of a holder onto which said loops are put one after another.

It is also expedient that the loop holder be made as a yoke rigidly linked to the support and that one end of the flexible untearable band be likewise rigidly connected to the support, while its other end be adapted for a load to apply.

A ring-shaped holder may be applied for destructing said loops. Such being the case the ring may also be rigidly coupled immediately to the flexible band whose one end is rigidly linked to the support and the other end is adapted for a load to apply.

It is also practicable to provide the loop holder in the form of a rodlike member whose one end is rigidly connected to the support, while the other end is for the loops to tear down.

Used as a flexible band in said device may be a woven (textile) ribbon on at least one side of which there is provided at least one row of woven loops made integral with said ribbon and having a width less than the width of the woven ribbon itself.

The warp of the woven ribbon may incorporate at least one system of loop warp threads arranged between the ground warp threads, from which loop warp threads woven with the weft threads there are formed a number of interloop sections and a row of loops interconnected with the interloop warp sections through successively arranged tying sections composed of loop warp threads, so that the tying sections of each loop are different in length, while the weft density of each loop rises in the direction from a longer to a shorter tying section.

Each woven loop of the ribbon may be twisted with respect to the tying sections and, besides, each of the loops may be substantially a plain circular weave and may have a circular cross-section.

Such a construction arrangement of the device for damping impact load in a safety system makes it possible to produce devices for damping impact load featuring practically unlimited range of operating threshold values from woven bands up to 50 mm wide by appropriately varying the number of the rows of loops, their arrangement on the flexible band and their linear dimensions, and the number of loop tearing-down holders. Besides, a possibility of non-destructive checks for quality of both the band and the device itself is also provided.

The essence of the invention resides in the following. The device for damping impact load in a safety system, comprising a support and a flexible untearable band associated therewith and incorporating an energy-absorbing means adapted to destruct after a load has been imposed thereupon and made as a number of loops from an elastic, long-sized material fastened on the band, and a contrivance in the form of a holder onto which the loops are put in succession, enables one to use, for the purpose of absorbing kinetic energy, the process of loop destruction by consecutively pulling them out of the holder, this being due to the fact that the loops are capable of sliding over the holder prior to load application. The amount of load at which the loops will start destructing successively on the holder can be preset by selecting the strength of each individual loop, its height and interloop spacing, as well as by the number of rows of the loops and their arrangement pattern on the band, and by the number of the loop tearing-down holders. Application of a flexible untearable band and loops from an elastic long-sized material in this device enables the putting of the band loops onto the holder to be carried out as a technological process, and the length of a flexible band may be much greater than the length of the holder itself. Besides, such a flexible untearable band may take up load whenever all the loops have become torn down.

Application of a holder made as a yoke rigidly linked to the support in this device for damping impact load enables one to put the loops successively onto either of its legs, or onto both of them at one time. Once all the loops have been torn down by pulling them off the yoke-shaped holder, the flexible band is detached from the device. When one end of the flexible band is also rigidly coupled to the support and the loops are pulled off the holder by a load applied to the other end of the flexible band, the flexible untearable band itself will take up the load applied once the loops have become torn down.

The device may incorporate a ring-shaped holder as well. Such a ring with the loops strung thereonto may directly be coupled to the flexible band one of whose ends is rigidly linked to the support and the other end is for a load to apply and for successive destruction of the loops by pulling them off the ring.

The device may use, as a flexible band, a woven ribbon on at least one side of which there are provided woven loops made integral with the ribbon and having their width less than the width of the ribbon itself. It is practicable, with a view to rendering a free stringing of the loops onto the holder a technologically realizable process and to obtaining a packaged device, that the loops would feature: a circular cross-section that could be attained, in particular, due to resorting to plain circular weave; the tying sections different in length, which interlink the loops with the ground warp of the band, impart additional elasticity thereto and afford a possibility of their twisting with respect to the tying sections; and the weft density increasing in the direction from a longer to a shorter tying section.

Generally speaking, textile woven ribbons with loops are most promising to be applied in such devices for damping impact load. There may be provided on at least one ribbon side one, two, or more rows of loops. The number of rows of loops and the ribbon structure as a whole are selected depending upon specific requirements the device must meet, as well as proceeding from the pattern-making ability of a loom. Such bands are suitable for making devices for damping impact load featuring a reliable threshold of operation up to 1000 kgf and more, the width of a band made from yarn having a strength of from 65 to 70 gf/tex amounting to 50 mm. The operating threshold of a device made up of woven bands with loops depends upon the number of the warp threads per loop, the loop height or, speaking more precisely, the number of the weft picks per loop, and the loop spacing or the number of the weft picks per interloop space of the band. In addition, production techniques of bands with loops and the technological process of putting the loops onto the holder for their being torn down make it possible to effect reliable non-destructive inspection for quality of finished products, which substantially enhances their operational reliability.

Adequate operational reliability of a device made from polyamid woven bands and a steel yoke-shaped holder has been supported by experiments carried out under various atmospheric conditions. The device exhibited reliable and stable operation when wet, frozen at −30° C. after having been poured with water, and frozen at −30° C. when dry. Trials of the device carried out at a load application rate of about 7 m/s have demonstrated that the threshold of operation, as compared to static load tests, remains practically unaffected. This tells of reliable operation of woven bands with loops in the device, as well as of the reliability of such devices as a whole.

Compact design of devices for damping impact load made from woven bands with loops enables such devices to be applied, first and foremost, as the shock absorbers of automobile safety seat belts. Besides, they can be used as shock absorbers of safeguard nets applied at construction sites, as well as safety belts of builders, erectors and mountaineers.

BRIEF DESCRIPTION OF THE DRAWINGS

In what follows the invention will be illustrated in a detailed description of some specific embodiments thereof to be read with reference to the accompanying drawings, wherein:

FIG. 8 is a modified embodiment of the device having a ring-shaped holder;

FIG. 9 is a modified embodiment of the device having a ring-shaped holder coupled immediately to the band;

FIG. 9a is the same as in FIG. 9 but with the ring having no association with the support;

FIG. 9b is the same as in FIG. 9 but with the ring having no association with the support and a changed load application point;

FIGS. 10, 11, 12, 13 illustrate the devices as shown in FIGS. 8, 9, 9a, 9b, respectively, after absorbing an impact load;

FIGS. 14 and 15 are modified embodiments of devices having a holder made as a rodlike element; and FIGS. 16 and 17 illustrate the devices as shown in FIGS. 14 and 15, respectively, after absorbing an impact load.

BEST MODE OF CARRYING OUT THE INVENTION

Figure 1:
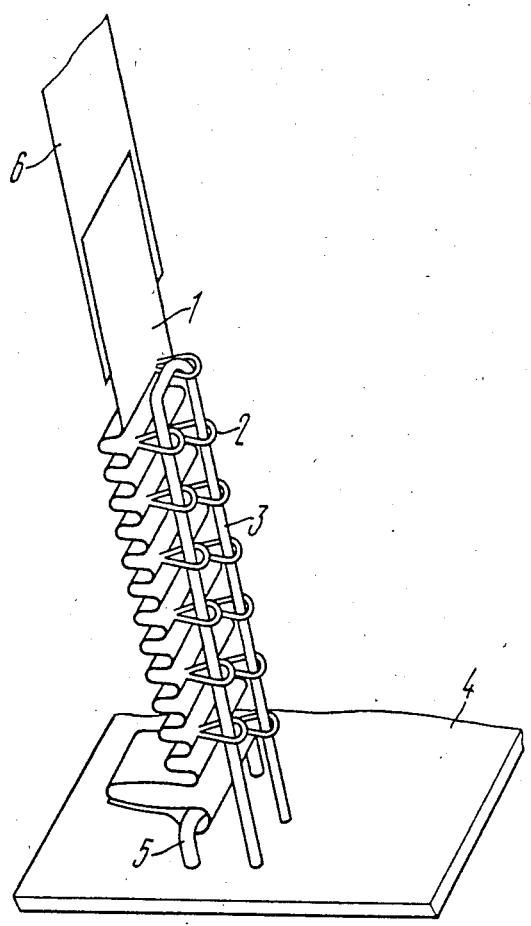
FIG. 1 is a general view of a device for damping impact load when used in an automobile safety seat belt, according to the invention.

The device for damping impact load (FIG. 1), according to the invention, comprises a flexible untearable band 1 having an energy-absorbing means, which is fashioned as two rows of loops 2 made of a longsized material and fastened on the band, and a holder in the form of a yoke 3 onto which the loops 2 are put one after another. The yoke 3 is rigidly coupled to a support 4 to which is in turn rigidly fastened, through a holding fixture 5, one of the ends of the flexible untearable band 1, while the other end of the band 1 is attached to an automobile safety seat belt 6. The holder may be made of any known material provided its strength is in excess of the operating threshold of the device.

Figure 2:
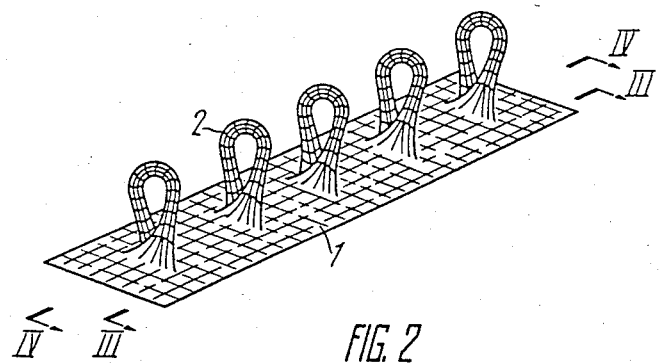
FIG. 2 is a general view of a flexible woven band.
Figure 3:
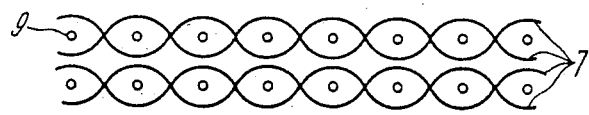
FIG. 3 is a section taken through the line III—III in FIG. 2.
Figure 4:
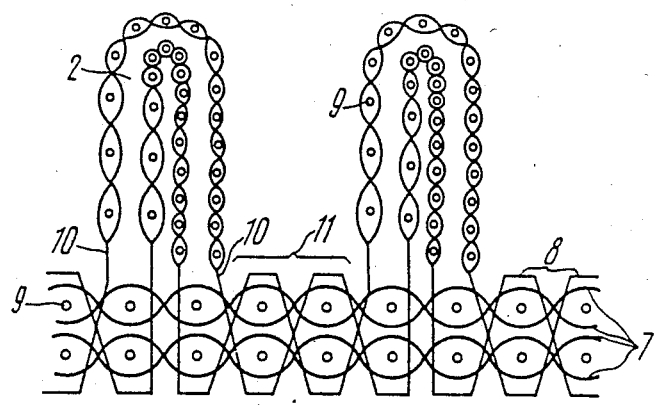
FIG. 4 is a section taken through the line IV—IV in FIG. 2.

Used as a flexible band may be any known bands. including woven ones. One of the practical embodiments of the flexible woven band 1 with the flexible long-sized woven loops 2 (FIGS. 2 to 4) made integral with the band 1, adapted for use in the device for damping impact load, comprises one system of ground warp threads 7, one system of loop warp threads 8 arranged between the ground threads 7, and one system of weft threads 9 (FIG. 4). The system of the ground warp threads 7, while interweaving with the weft threads to form a plain circular weave 3/1, 1/3, thus establishing a double-layer ground of the flexible band 1 (FIG. 3). The system of the loop warp threads 8 likewise interweaves with the weft threads 9 to form a plain circular weave 3/1, 1/3, thus establishing the double-layer circular crosssection loops 2 (FIGS. 2, 4), which are attached, through different-length tying sections 10, to the ground of the band 1 by virtue of the system of the loop warp threads 8 interweaving with the weft threads 9 in an interloop space 11 of the ground of the band 1 to form the 2/2 weave (FIG. 4). The weft density of the loops 2 increases in the direction from the longer tying section 10 to the shorter section, and each of the loops is twisted with respect to its tying sections 10 (FIG. 2). The interloop section 11 of such a band, and more precisely speaking, the number of the weft picks per said section should provide a firm attachment of the loop weft threads 8 and prevent them against being pulled from one loop 2 into the other under the effect of the load applied.

The device for damping impact load (FIG. 5), according to the invention, comprises the support 4 and the flexible untearable band 1 linked to the support 4 and incorporating an energy-absorbing means, which is fashioned as a number of the loops 2 made from an elastic, long-sized material and fastened on the band, and the yoke 3 rigidly secured to the support 4. The loops 2 are strung one after another onto one of the legs of the yoke 3. One end of the flexible band 1 is also rigidly coupled to the support 4, while the other end is adapted for a load to apply.

Figure 5:
FIG. 5 is a side view of a modified embodiment of a device having a yoke-shaped holder.
Figure 5A:
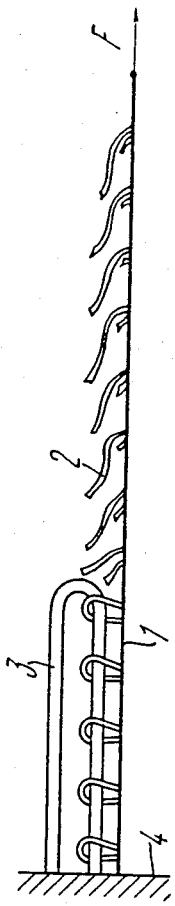
FIG. 5a is the same as in FIG. 5 but the band has no association with the support.

In the embodiment of the construction arrangement of the device as shown in FIG. 5a, as distinct from that shown in FIG. 5 the flexible band 1 has no rigid connection to the support 4. A load may be applied to one of the ends of the flexible band.

The devices for damping impact load as shown in FIGS. 8 and 9, according to the invention, comprise the support 4 and the flexible untearable band 1 connected to the support 4 and incorporating an energy-absorbing means fashioned as a plurality of the loops 2 made of a flexible, long-sized material and fastened on the band, and a ring 12 rigidly connected, through a coupling means 13, to the support 4 (FIG.8) or directly to the flexible band 1 (FIG. 9). One end of the band 1 is rigidly linked to the support 4, and the other end is for a load to apply. The loops 2 of the flexible band 1 are strung one after another onto the ring 12.

According to the embodiments of the construction arrangement of the device for damping impact load as shown in FIGS. 9a, 9b, in contrast to the device as illustrated in FIGS. 8 and 9, ring 12 is rigidly associated neither with the support 4 nor with the band 1. In such cases load may be applied either to the loose end of the flexible band 1 (FIG. 9a) or to the ring 12 (FIG. 9b).

A particular instance is also possible where use may be made, for tearing down the loops, of a holder fashioned as a rodlike element as shown in FIGS. 14 and 15. In the devices of these figures the loops 2 of the flexible band 1 are put onto a rodlike element 14 (FIG. 4) or 15 (FIG. 15) one after another, one end of said element being rigidly linked to the support 4 and the other end is for the loops to tear down.

The device for damping impact load functions as follows.

Figure 6:
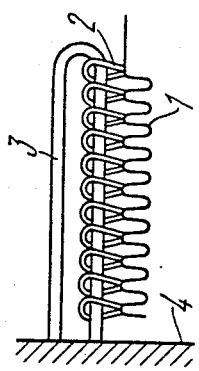
FIGS. 6 and 7 illustrate the device as shown in FIGS. 5 and 5a, respectively, after absorbing an impact load.
Figure 7:
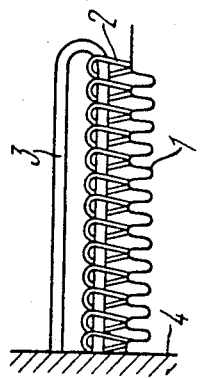

When a load F (FIGS. 6, 7) exceeding the tensile strength of the loops 2 is applied to the loose end of the flexible untearable band, the loops 2 while sliding over the leg of the yoke 3 get torn down one after another, thus absorbing kinetic energy. Once all the loops 2 have been torn down, the load is taken up by the flexible untearable band 1 (FIG. 6), or the band 1 is detached from the yoke 3 after all the loops 2 (FIG. 7) have been torn down.

When a load F (FIGS. 10, 11, 12) exceeding the tensile strength of the loops 2, is applied to the loose end of the flexible untearable band 1, the loops 2, while sliding over the ring 12, become torn down one after another, either on one side of the band 1 (FIGS. 10, 11), or on both sides of the band 1 (FIG. 12), thus absorbing kinetic energy. Once the loops 2 have been torn down the load is taken up by the band 1.

The effect of the load F exceeding the tensile strength of the loops 2, upon the ring 12 (FIG. 13) causes the loops 2 to slide along the ring 12 and to tear down one after another, thus absorbing kinetic energy. Once all the loops have been torn down the ring 12 is detached from the flexible band.

When a load F (FIGS. 16, 17) exceeding the tensile strength of the loops 2, is applied to the loose end of the flexible band 1, the loops 2, while sliding along the rodlike element 14 (FIG. 16) or 15 (FIG. 17), are torn down one after another at the ends of said elements shaped either as a hook (FIG. 16) or a ball (FIG. 17). Once the loops 2 have been torn down, the load is taken up by the flexible band 1 itself.

In contradistinction to the heretofore known constructions of devices for damping impact load the present device is capable of providing a practically unlimited range of operating threshold values due to varying the number of the rows of loops, the loop height and spacing, the arrangement of the loops on the band, the order of putting the loops onto the holder, the number of the flexible bands and loop tearing holders in the device, as well as the point of load application. Apart from all mentioned above, the operation of the device is based upon a more effective and reliable concept of kinetic energy absorption, consisting in destruction of the loops put onto the holder of the device for their being torn down.

INDUSTRIAL APPLICABILITY

The invention is successfully applicable as a shock absorber in automobile safety seat belts, as well as in the field of construction engineering for the safety belts of builders and erectors, and also as part of mountaineers' rigging.

What is claimed is:

1. A device for damping impact load in a safety system, comprising: a support; a flexible untearable band incorporating an energy-absorbing means destructible under the effect of an impact load, said energy-absorbing means including a plurality of independent loops made of a flexible, elongated material, each of the loops connected to the band at spaced positions therealong; a holder means onto which said loops are put one after another; and an end of the band and the holder means are connected to the support, wherein the flexible band is a woven ribbon provided on at least one side with at least one row of woven loops integral with said ribbon, said loops having a width less than the width of the band and comprising a base weave formed from interwoven ground warp threads and weft threads, and disposed in the base weave between the ground warp threads is at least one system of loop warp threads, whereon are formed, by virtue of interweaving with weft threads, a plurality of interloop sections and a row of the loops, which are associated with the warp interloop sections through successively arranged tying sections made up of the loop warp threads, the tying sections of each loop being different in length and the weft density of each loop increasing in the direction from a longer to a shorter tying section.

2. A woven ribbon as claimed in claim 1, wherein each loop is twisted with respect to the tying sections.

3. A woven ribbon as claimed in claim 1, wherein each loop is a plain circular weave.

4. A woven ribbon as claimed in claim 1, wherein each loop has a circular cross-section.

* * * * *